US005767197A

United States Patent [19]
Fukatsu et al.

[11] Patent Number: 5,767,197
[45] Date of Patent: Jun. 16, 1998

[54] MOISTURE CURABLE POLYMER COMPOSITION AND PROCESS FOR PRODUCTION THEREOF

[75] Inventors: Syunsuke Fukatsu, Nagaokakyo; Yoshiya Hattori, Takatsuki, both of Japan

[73] Assignee: Sunstar Giken Kabushiki Kaisha, Takatsuki, Japan

[21] Appl. No.: 616,009

[22] Filed: Mar. 14, 1996

[30] Foreign Application Priority Data

Mar. 17, 1995 [JP] Japan ................... 7-058749

[51] Int. Cl.$^6$ ............ C08F 8/00; C08L 83/00; C08G 77/04
[52] U.S. Cl. .......... 525/101; 525/100; 525/102; 528/26; 528/28
[58] Field of Search ................. 525/100, 101, 525/102; 528/26, 28

[56] References Cited

U.S. PATENT DOCUMENTS 5,254,619  10/1993  Ando ........................ 524/504
5,423,735  6/1995  Callinan et al. ............... 602/8

FOREIGN PATENT DOCUMENTS

0410199A2  7/1990  Germany.

OTHER PUBLICATIONS

EPO Search Report.

*Primary Examiner*—Patrick D. Niland
*Attorney, Agent, or Firm*—Jacobson, Price, Holman & Stern, PLLC

[57] ABSTRACT

A moisture curable polymer composition, which comprises (A) a polymer having at least two functional groups reactive with an isocyanate group selected from a hydroxyl group, a mercapto group and a mono-substituted or unsubstituted amino group and further at least two hydrolyzable silyl groups in the molecule, wherein the silyl groups are introduced via a urethane bond or urea bond to the functional groups, and (B) fine particles of an acrylic copolymer produced by copolymerizing an acrylic monomer having one polymerizable unsaturated group and an acrylic monomer having two or more (meth)acryloyloxy groups, wherein the fine particles of an acrylic copolymer (B) are homogeneously dispersed in the polymer (A), and a process for the production thereof. Said moisture curable polymer composition is able to give a rubber-like cured product having excellent mechanical properties, high elasticity, high toughness and excellent adhesiveness and is useful as a coating material, sealant, or adhesive.

19 Claims, No Drawings

MOISTURE CURABLE POLYMER COMPOSITION AND PROCESS FOR PRODUCTION THEREOF

TECHNICAL FIELD

This invention relates to a moisture curable polymer composition and a process for the production thereof. More particularly, it relates to a polymer composition which comprises a polymer having at least two hydrolyzable silyl groups within the molecule and fine particles of an acrylic copolymer, a part of the comonomers for said acrylic copolymer being an acrylic monomer having two or more polymerizable unsaturated groups, wherein the fine particles of an acrylic copolymer are homogeneously dispersed in the polymer having hydrolyzable silyl groups. When the polymer composition is cured with moisture, it can form a rubber-like cured product having excellent mechanical properties, high elasticity and high toughness and further excellent adhesiveness. This invention provides further a process for the production of the moisture curable polymer composition having hydrolyzable silyl groups by using a polymer having at least two functional groups reactive to an isocyanate group selected from the group consisting of a hydroxyl group, a mercapto group and a mono-substituted or unsubstituted amino group.

PRIOR ART

It is known that a polyether having at least one reactive silyl group (e.g. a silanol group or a hydrolyzable silyl group) within the molecule can form a cured product having rubber elasticity by moisture curing, and hence, it has been used as a coating material, a sealant and an adhesive. However, since it is not necessarily satisfactory in view of less mechanical strength and less adhesiveness when cured, it has been desired to develop a polymer having more improved properties.

Thus, many researchers have studied to find an improved polyether having a reactive silyl group which has excellent mechanical properties and excellent adhesiveness and have reported various products, for example, (i) a moisture curable polymer composition having improved weatherability and adhesiveness, which is produced by copolymerizing an acrylic monomer selected from an alkyl (meth)acrylate, 2-hydroxyethyl (meth)acrylate, glycidyl (meth)acrylate, etc. and at least one of (meth) acryloyloxyalkylalkoxysilanes in the presence of a polyether containing at least one hydrolyzable silyl group within the molecule, whereby fine particles of the resulting acrylic copolymer are homogeneously dispersed in the said polyether (cf. Japanese Patent Second Publication (Kokoku) No. 63-65086);

(ii) a moisture curable polymer composition having improved retention of rubber elasticity, improved mechanical properties and adhesiveness when cured, which is produced by homogeneously dispersing fine particles of an acrylic copolymer obtained by vinyl polymerization of a high cohesive acrylic monomer mixture containing at least partially an epoxy group-containing monomer (e.g. a mixture of acrylonitrile, methyl methacylate and glycidyl (meth) acrylate, etc.) into a polyether containing at least one hydrolyzable silyl group within the molecule (cf. Japanese Patent First Publication (Kokai) No. 5-194677);

(iii) a moisture curable polymer composition having improved properties particularly in the mechanical properties, adhesiveness and workability, which is produced by copolymerizing a monomer containing a polymerizable unsaturated group in the presence of a polyether containing a functional group to be able to introduce a reactive silyl group thereto, and thereby dispersing homogeneously fine particles of an acrylic copolymer into said polyether, and thereafter introducing a reactive silyl group via the functional group in the polyether. Said polymerizable unsaturated group-containing monomer is, for example, monomers having no such a reactive functional group as epoxy group, reactive silyl group, hydroxyl group, amino group, isocyanate group, mercapto group, carboxyl group (e.g. a styrene monomer, (meth)acrylic esters, (meth)acrylic amides, (meth)acrylic acid, etc.); monomers having such a reactive functional group as mentioned above (e.g. glycidyl (meth) acrylate, (meth)acryloyloxy-alkylalkoxysilane, hydroxypropyl (meth) acrylate, dimethylaminoethyl (meth) acrylate, a reaction product of equimolar amounts of hydroxyethyl (meth)acrylate and an organic diisocyanate, a reaction product of equimolar amounts of hydroxyethyl (meth)acrylate and thioglycolic acid, etc.) (cf. Japanese Patent First Publication (Kokai) No. 5-194678).

In the above, "(meth)acrylic acid" includes acrylic acid and methacylic acid, "(meth)acrylate" include acrylate and methacrylate, and "(meth)acryloyloxy" includes acryloyloxy and methacryloyloxy, hereinafter the same.

However, in the above moisture curable polymer compositions (i) to (iii), the monomer for the acrylic copolymer fine particles to be dispersed in the base polymer (i.e. the polyether) contains one polymerizable unsaturated group, and hence, when a cured product is formed from said polymer composition, the elasticity of the cured product is limited and can not be enhanced much beyond the rubber elasticity of the base polymer, and hence, those products are still insufficient in the mechanical properties including toughness and further in the adhesiveness to various adherends. Moreover, when the polymer composition is incorporated with a filler and/or a plasticizer, the desired enforcement of the rubber elasticity including toughness is still insufficient.

Under the circumstances, the present inventors have intensively studied to find an improved polymer composition by eliminating the above-mentioned defects in the known moisture curable polymer compositions (i) to (iii), and have found that the desired moisture curable polymer composition having improved properties can be obtained by using, as the starting polymer, a polymer having at least two functional groups reactive with an isocyanate group selected from a hydroxyl group, a mercapto group, and a mono-substituted or unsubstituted amino group, and dispersing homogeneously into the starting polymer fine particles of an acrylic copolymer wherein at least a part of the monomers composing said acrylic copolymer comprises an acrylic monomer containing two or more (meth)acryloyloxy groups, and thereafter introducing at least two hydrolyzable silyl groups into the molecule of the polymer via a urethane bond or urea bond to the functional group contained in said polymer. The moisture curable polymer composition thus produced contains a urethane bond or urea bond and also a hydrolyzable silyl group, and hence, the composition can be adhered to various kinds of adherends. Moreover, owing to the hydrolyzable silyl group in the base polymer and the two or more (meth)acryloyloxy groups in the acrylic monomer for the acrylic copolymer fine particles as well as a high molecular weight of the resulting copolymer, the polymer composition exhibits excellent mechanical properties including high elasticity and excellent toughness, and further by incorporating therein a filler or a plasticizer, the desired enforcement effects can be achieved. The present inventor have further found that when the acrylic copolymer per se contains a hydrolyzable silyl group, the properties such as tensile strength at breakage and elongation at breakage are more improved.

SUMMARY DESCRIPTION OF THE INVENTION

An object of the invention is to provide a moisture curable polymer composition, which comprises (A) a polymer having at least two functional groups reactive with an isocyanate group selected from a hydroxyl group, a mercapto group and a mono-substituted or unsubstituted amino group and further at least two hydrolyzable silyl groups in the molecule, wherein the silyl groups are introduced via a urethane bond or urea bond to the functional groups, and (B) fine particles of an acrylic copolymer produced by copolymerizing an acrylic monomer having one polymerizable unsaturated group and an acrylic monomer having two or more (meth)acryloyloxy groups, wherein the fine particles of an acrylic copolymer (B) are homogeneously dispersed in the polymer (A).

Another object of the invention is to provide a process for the production of a moisture curable polymer composition, which comprises steps of

[in Process (a)]:

(i): copolymerizing an acrylic monomer having one polymerizable unsaturated group and an acrylic monomer having two or more (meth)acryloyloxy groups in the presence of a polymer having at least two functional groups reactive with an isocyanate group selected from a hydroxyl group, a mercapto group and a mono-substituted or unsubstituted amino group (A'), thereby dispersing homogeneously fine particles of the resulting acrylic copolymer (B) in the polymer (A'); and (ii)-1: reacting the functional groups of the polymer (A') with an excess amount of a diisocyanate compound to form a free isocyanate group, and then reacting the isocyanate group with an alkoxysilane having a functional group reactive therewith, or (ii)-2: reacting the functional groups of the polymer (A') with an isocyanato-alkoxysilane, by which introducing at least two hydrolyzable silyl groups via a urethane bond or urea bond within the molecule of the polymer (A');

or alternatively,

[in Process (b)]:

(i')-1: reacting a polymer having at least two functional groups reactive with an isocyanate group selected from a hydroxyl group, a mercapto group and a mono-substituted or unsubstituted amino group (A') with a diisocyanate compound to form a free isocyanate group, and reacting the resultant with an alkoxysilane having a functional group reactive with the isocyanate group, or (i')-2: reacting the polymer having at least two functional groups (A') as mentioned above with an isocyanatoalkoxysilane, by which introducing at least two hydrolyzable silyl groups via a urethane bond or urea bond in the molecule of the polymer (A'); and (ii'): copolymerizing an acrylic monomer having one polymerizable unsaturated group and an acrylic monomer having two or more (meth)acryloyloxy groups in the presence of the polymer (A) obtained in·the above (i')-1 or (i')-2, by which fine particles of an acrylic copolymer (B) produced by the above copolymerization are homogeneously dispersed in the polymer (A).

DETAILED DESCRIPTION OF THE INVENTION

The starting polymer (A') used in the present invention includes a polymer having at least two of a functional group reactive with an isocyanate group, such as a hydroxyl group (—OH), a mercapto group (—SH), and a mono-substituted or unsubstituted amino group [—NHR wherein R is hydrogen atom, an alkyl having 1 to 10 carbon atoms (e.g. methyl, ethyl, propyl, n-butyl, or tert-butyl), or phenyl], which has usually a molecular weight of 1,000 to 50,000, preferably 3,000 to 30,000. Suitable examples of the polymer are as follows.

The polymer having OH group includes polyether polyols which are produced by addition polymerization of propylene oxide or a mixture of propylene oxide and an other alkylene oxide (e.g. ethylene oxide) to a polyvalent alcohol (e.g. ethylene glycol, propylene glycol, glycerin, trimethylolpropane, pentaerythritol, sorbitol, sucrose, etc.); polyalkylene glycols such as oligoglycols (e.g. polyethylene glycol (PEG), polyporpylene glycol (PPG), ethylene glycol, propylene glycol, butylene glycol, hexylene glycol, etc.); polytetramethylene ether glycols; polycaprolactone polyols; polyester polyols (e.g. polyethylene adipate); polybutadiene polyols and hydrogenated products thereof; hydroxyl group-containing higher fatty acid esters (e.g. castor oil).

The polymer having SH group includes liquid polysulfide polymers having the following formula:

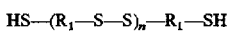

wherein $R_1$ is $—C_2H_4—$, $—C_3H_6—$, $—C_2H_4—O—C_2H_4—$, $—C_2H_4—O—CH_2—O—C_2H_4—$, $—C_3H_6—O—C_3H_6—O—C_3H_6—$, or $—C_2H_4—O—(C_2H_4—O)_{1-30}—C_2H_4—$, and n is an integer of 2 to 50, which is usually liquid or viscous liquid with transparent amber color at room temperature. Specific example is the compound of the formula:

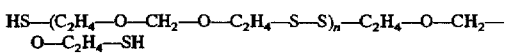

which are commercially available, for example, "Thiokol LP-21", "Thiokol LP-12", "Thiokol LP-32" (all of them, average molecular weight, 4000, manufactured by Toray Thiokol K.K.), and "Thiokol LP-31" (average molecular weight, 7500, manufactured by Toray Thiokol K.K.).

The polymer containing —NHR group includes a compound of the formula: $H_2N—PPG—NH_2$ which is commercially available, for example, "JEFFAMINE D-320", "JEFFAMINE D-400", "JEFFAMINE T-403", "JEFFAMINE EDR-148" (all of them, manufactured by TEXACO).

The acrylic momoner having one polymerizable unsaturated group used in the present invention may further contain a reactive functional group (e.g. epoxy group, reactive silyl group, hydroxyl group, amino group, isocyanate group, mercapto group, carboxyl group). Examples of the one polymerizable unsaturated group-containing acrylic monomer are acrylic esters (e.g. methyl acrylate, ethyl acrylate, propyl acrylate, n-butyl acrylate, isobutyl acrylate, amyl acrylate, hexyl acrylate, 2-ethylhexyl acrylate, cyclohexyl acrylate, n-octyl acrylate, glycidyl acrylate, 2-hydroxyethyl acrylate, 2-hydroxypropyl acrylate, dimethylaminoethyl acrylate, etc.); methacrylic esters (e.g. methyl methacrylate, ethyl methacrylate, n-butyl methacrylate, isobutyl methacrylate, 2-ethylhexyl methacrylate, lauryl methacrylate, tridecyl methacrylate, benzyl methacrylate, cyclohexyl acrylate, tetrahydrofurfuryl methacrylate, 2-hydroxyethyl methacrylate, 2-hydroxypropyl methacrylate, glycidyl methacrylate, 2-methoxyethyl methacrylate, 2-ethoxyethyl methacrylate, dimethylaminoethyl methacrylate, etc.); vinylsilanes having a hydrolyzable group (e.g. vinylmethyldimethoxysilane, vinyltrimethoxysilane, vinylmethyldichlorosilane, vinyltriethoxysilane, vinyltris(β-methoxyethoxy)silane, etc.); (meth)acryloyloxyalkylsilanes having a hydrolyzable group (e.g. γ-methacryloyloxypropyltrimethoxysilane, γ-methacryloyloxypropylmethyldimethoxysilane, γ-acryloyloxypropyltrimethoxysilane, γ-methacryloyloxypropylmethyldichlorosilane, γ-acryloyloxypropyltrichlorosilane, etc.); acrylic monomers containing a mercapto group (e.g. a reaction product of equimolar amounts of hydroxyethyl (meth)acrylate and thioglycolic acid, etc.); acrylic monomer containing an isocyanate group (e.g. methacryloyl isocyanate, acryloylethyl isocyanate, etc.); and further (meth)acrylic acid, vinyl acetate, vinyl propionate, vinyl versatate ("Veova", manufactured by Shell Chemical K.K.), vinyl chloride, vinyl alcohol, acrylonitrile, styrene, (meth)acylic amide, N-methylolacrylic amide, N,N-dimethyl(meth)acrylamine, vinylpyridine, maleic anhydride, vinylpyrrolidone, and the like. These monomers may be used alone or in combination of two or more thereof.

The one polymerizable unsaturated group-containing acrylic monomer is usually used in an amount of 5 to 70 parts by weight, preferably 15 to 50 parts by weight, to 100 parts by weight of the starting polymer (e.g. OH-containing polymer, SH-containing polymer, NHR-containing polymer). When the amount of the monomer is less than 5 parts by weight, the desired properties such as high tensile strength, high elongation can almost not be achieved, and on the other hand, when the amount is over 70 parts by weight, the resulting polymer composition has too high viscosity and tends to show less workability.

The acrylic monomer having two or more (meth)acryloyloxy groups used in the present invention includes a compound of the formula:

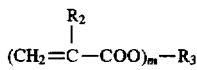

wherein $R_2$ is H or $CH_3$, $R_3$ is an organic residue such as alkanediols having 4 to 10 carbon atoms (e.g. 1,4-butanediol, 1,6-hexanediol, 1,9-nonanediol), alkylene glycol or polyalkylene glycol having 2 to 6 carbon atoms (e.g. neopentyl glycol, ethylene glycol, diethylene glycol, triethylene glycol, tetraethylene glycol, polyethylene glycol, 1,3-butylene glycol, propylene glycol, dipropylene glycol, tripropylene glycol, polypropylene glycol, etc.), m is an integer of 2 or more, preferably 2 to 4.

Suitable examples of the two or more (meth)acryloyloxy group-containing acrylic monomer are 1,4-butanediol di(meth)acrylate, 1,6-hexanediol di(meth)acrylate, 1,9-nonanediol di(meth)acrylate, neopentyl glycol di(meth)acrylate, ethylene glycol di(meth)acrylate, diethylene glycol di(meth)acrylate, triethylene glycol di(meth)acrylate, polyethylene glycol (#200, 400, 600) di(meth)acrylate, 1,3-butylene glycol di(meth)acrylate, dipropylene glycol di(meth)acrylate, polypropylene glycol di(meth)acrylate, tetraethylene glycol diacrylate, tripropylene glycol diacrylate, trimethylolpropane tri(meth)acrylate, trimethylolethane tri(meth)acrylate, pentaerythritol tri(meth)acrylate, pentaerythritol tetraacrylate, and the like. These acrylic monomers may be used alone or in combination of two or more thereof.

The two or more (meth)acryloyloxy group-containing acrylic monomer is used in an amount of not more than 10% by mole, preferably $1 \times 10^{-3}$ to 1% by mole, based on the total amount of the two or more (meth)acryloyloxy group-containing acrylic monomer and the one polymerizable unsaturated group-containing acrylic momoner. When the amount of the two or more (meth)acryloyloxy group-containing acrylic monomer is over 10% by mole, three-dimensional crosslinking reaction of the acrylic molecule proceeds with embrasing the dispersion medium, and hence, the reaction mixture tends to become highly viscous or be gelated.

In addition to the above, the following compounds are also included in the two or more (meth)acryloyloxy group-containing acrylic monomer, for example, a polyether (or polyester) polyol urethane poly(meth)acrylate having two or more (meth)acryloyloxy groups which is produced by reacting a polyether polyol or a polyester polyol with a polyisocyanate and a hydroxyalkyl (meth)acrylate; an epoxy (meth) acrylate having two (meth)acryloyloxy groups which is produced by reacting a diepoxide and a (meth)acrylic acid; an acrylic acid polyether or polyester which is produced by capping the terminus of a polyether polyol or a polyester polyol with acrylic acid or acryloyl chloride; and a urethane polyacrylate which is produced by capping the terminus of a diisocyanate compound with a hydroxyalkyl acrylate.

In the polymer composition of the present invention, at least a part of the monomers for the acrylic copolymer fine particles shall be a two or more (meth)acryloyloxy group-containing acrylic monomer. When the one polymerizable unsaturated group-containing acrylic monomer is used alone, the acrylic copolymer fine particles to be homogeneously dispresed in the base polymer having hydrolyzable silyl group has a lower molecular weight, and hence, is swollen with the surrounding dispesion medium (i.e. the base polymer, a plasticizer, etc.), which results unfavorably in increase of viscosity of the composition (for instance, when it is formulated as an adhesive together with conventional additives such as filler, it has a viscosity of about 800,000 cps). On the other hand, when a two or more (meth)acryloyloxy group-containing acrylic monomer is used together, the resulting acrylic copolymer has a higher molecular weight, and is hardly swollen with the surrounding dispersion medium, which results in less increasing of viscosity (for example, when it is formulated as an adhesive, it has a viscosity of about 350,000 cps.).

The moisture curable polymer composition of the present invention can be produced by the following processes.

[Process (a)]

Step (i): Firstly, each prescribed amount of the above-mentioned one polymerizable unsaturated group-containing acrylic monomer and two or more (meth)acryloyloxy group-containing acrylic monomer are copolymerized in the presence of the starting polymer such as an OH-containing polymer, an SH-containing polymer or an NHR-containing polymer, fine particles of an acrylic copolymer having a particle size of 1–7 μm are formed wherein the acrylic copolymer fine particles are homogeneously dispersed in the starting polymer.

The above copolymerization reaction can be carried out by a conventional method, for instance, under an atmosphere of an inert gas and optionally in an appropriate solvent (e.g. ethyl acetate, methyl ethyl ketone, etc.) and in the presence of a polymerization initiator (e.g. azobisisobutyronitrile, benzoyl peroxide, a t-alkyl peroxy ester, dicumyl peroxide, acetyl peroxide, diisopropyl peroxydicarbonate, a persulfate, etc.) at a temperature of 60° to 100° C. for 4 to 12 hours.

The above copolymerization may optionally carried out in the presence of another acrylic monomer having additionally a reactive functional group as a part of the one polymerizable unsaturated group-containing acrylic monomer, for example, a vinylsilane having a hydrolyzable group or a (meth)acryloyloxyalkylsilane having a hydrolyzable group as mentioned hereinbefore, and thereby a hydrolyzable silyl group can be introducted also into the acrylic copolymer fine particles.

Step (ii): Thereafter, at least two hydrolyzable silyl groups are introduced into the starting polymer molecule via a urethane bond or urea bond to the functional group (OH, SH or NHR) in the starting polymer by the following step (ii)-1 or (ii)-2.

Step (ii)-1: The starting polymer (A') is reacted with an excess amount (to the functional group of the starting polymer) of an isocyanate compound (e.g. tolylene diisocyanate, 4,4'-diphenylmethane diisocyanate, xylylene diisocyanate, naphthylene diisocyanate, para-phenylene diisocyanate, tetramethylxylylene diisocyanate, hexamethylene diisocyanate, dicyclohexylmethane diisocyanate, isophorone diisocyanate, lysine diisocyanate, hydrogenated xylylene diisocyanate, cyclohexyl diisocyanate, toluidine diisocyanate) to form a free isocyanate group (NCO), and then the resultant is reacted with about equimolar amount of an alkoxysilane having a functional group reactive with the NCO group (hereinafter, referred to as "NCO-reactive alkoxysilane"), by which a hydrolyzable silyl group is introduced.

The above NCO-reactive alkoxysilane includes, for example, γ-aminopropyltrimethoxysilane, γ-aminopropyltriethoxysilane, γ-aminopropylmethyldimethoxysilane, N-aminoethylaminopropyltrimethoxysilane, N-aminoethylaminopropylmethyldimethoxysilane, 1,3-diaminoisopropyltrimethoxysilane, γ-N-phenylaminopropyltrimethoxysilane, bis(trimethoxysilylpropyl)amine, γ-ureidopropyltrimethoxysilane, γ-hydroxpropyltrimethoxysilane, γ-mercaptopropyltrimethoxysilane, γ-mercaptopropylmethyldimethoxysilane, and the like.

Step (ii)-2: The starting polymer (A') is reacted with an isocyanato-alkoxysilane in an amount of about equimolar to the functional group of the starting polymer (A'), by which a hydrolyzable silyl group is introduced.

The above isocyanato-alkoxysilane includes, for example, isocyanato-propyltriethoxysilane, isocyanato-propyltrimethoxysilane, isocyanato-propylmethyldimethoxysilane, isocyanato-trimethoxysilane, diisocynato-dimethoxysilane.

Into the polymer to which at least two hydrolyzable silyl groups are introduced as above [the base polymer (A)] there are homogeneously dispersed fine particles of an acrylic polymer prepared by copolymerization of a one polymerizable unsaturated group-containing acrylic monomer and a two or more (meth)acryloyloxy group-containing acrylic monomer to give the desired moisture curable polymer composition.

[Process (b)]

The Process (b) may be carried out under the basically the same conditions as the above Process (a) except that the step (i) and the step (ii) are carried out in the reverse order. That is, in (i')-1 and (i')-2 steps, the base polymer (A') is reacted with a diisocyanate compound and thereafter with an alkoxysilane having an NCO-reactive functional group or is reacted with an isocyanato-alkoxysilane like in the steps (ii)-1 and (ii)-2 in the above Process (a) respectively, by which at least two hydrolyzable silyl groups are introduced into the base polymer (A') via a urethane bond or urea bond, and thereafter, the copolymerization reaction of a one polymerizable unsaturated group-containing acrylic monomer and a two or more (meth)acryloyloxy group-containing acrylic monomer is carred out in the presence of the polymer (A) obtained in the step (i')-1 or (i')-2, by which fine particles of the acrylic copolymer (B) are homogeneously dispersed into the polymer (A) to give the desired moisture curable polymer composition.

In the above moisture curable polymer composition, the acrylic copolymer fine particles may also include a hydrolyzable silyl group, which is introduced by the following process (c)-1, (c)-2 or (c)-3.

Process (c)-1: The copolymerization reaction of a one polymerizable unsaturated group-containing acrylic monomer and a two or more (meth)acryloyloxy group-containing acrylic monomer is carred out in the presence of a chain transfer agent having a hydrolyzable silyl group (e.g. γ-mercaptopropylmethyldimethoxysilane, γ-mercaptopropyltrimethoxysilane) in an amount of 0.0001 to 1% by mole, preferably 0.0005 to 0.05% by mole, based on the total amount of the above acrylic monomers. When the amount of the chain transfer agent is over 0.1% by mole, the resulting acrylic copolymer tends to have disadvantageously a lower molecular weight.

Process (c)-2: The copolymerization reaction of a one polymerizable unsaturated group-containing acrylic monomer and a two or more (meth)acryloyloxy group-containing acrylic monomer is carred out by using at least one of the vinylsilanes having a hydrolyzable group or the (meth)acryloyloxyalkylsilanes having a hydrolyzable group as mentioned hereinbefore as a part of the one hydrolyzable unsaturated group-containing acrylic monomer, said vinylsilane or (meth)acryloyloxyalkylsilane being used in an amount of $2.5 \times 10^{-2}$% by mole based on the total amount of the starting acrylic monomers.

Process (c)-3: The copolymerization reaction of a one polymerizable unsaturated group-containing acrylic monomer and a two or more (meth)acryloyloxy group-containing acrylic monomer is carred out by using a monomer selected from hydroxy (OH) group-containing acrylic monomers (e.g. 2-hydroxyethyl acrylate, 2-hydroxypropyl acrylate, 2-hydroxyethyl methacrylate, 2-hydroxypropyl methacrylate, vinyl alcohol), amino group-containing acrylic monomers (e.g. dimethylaminoethyl acrylate, dimethylaminoethyl methacrylate, (meth)acrylic amide, N-methylolacrylic amide, dimethylamino-2-hydroxypropyl (meth)acrylate, morpholinoethyl (meth)acrylate, N,N-dimethyl-(meth)acrylamine, vinylpyridine, vinylpyrrolidone), isocyanate (NCO) group-containing acrylic monomers (e.g. methacryloyl isocyanate, acryloylethyl isocyanate, etc.), mercapto (SH) group-containing acrylic monomers (e.g. a reaction product of equimolar amounts of hydroxyethyl (meth)acrylate and thioglycolic acid, etc.), epoxy group-containing acrylic monomers (e.g. glycidyl acrylate, glycidyl methacrylate, 1-vinylcyclohexane-3,4-epoxide, butadiene glycidyl ether, glycidyl crotonate, glycidyl cinnamate, glycidyl vinylbenzoate), and carboxyl (COOH) group-containing acrylic monomers (e.g. acrylic acid, methacrylic acid), and thereafter, the resulting polymer is reacted with an alkoxysilane which is reactive to the OH, amino, NCO, SH, epoxy or COOH group in the resulting polymer, said alkoxysilane being used in an amount of about equimolar to the functional group of the polymer, by which a hydrolyzable silyl group is introduced into the molecule of the acrylic polymer. The monomer having OH, amino, NCO, epoxy, or COOH group is usually used in an amount of not more than $2.5 \times 10^{-3}$% by mole based on the total amount of the acrylic monomers.

When the acrylic monomer having a reactive fuctional group selected from OH, amino, SH, or COOH is used as a part of the starting one polymerizable unsatrated group-containing acrylic monomer in the copolymerization reaction as mentioned above, the alkoxysilane to be reacted with the resulting copolymerization reaction product is an isocyanatoalkoxysilane compound selected from the same isocyanatoalkoxysilane compounds as mentioned in the Process (a), Step (ii)-2 hereinbefore.

In case of using an acrylic monomer having an amino group as the reactive functional group, the alkoxysilane is an epoxyalkoxysilane compound selected from the following compounds:

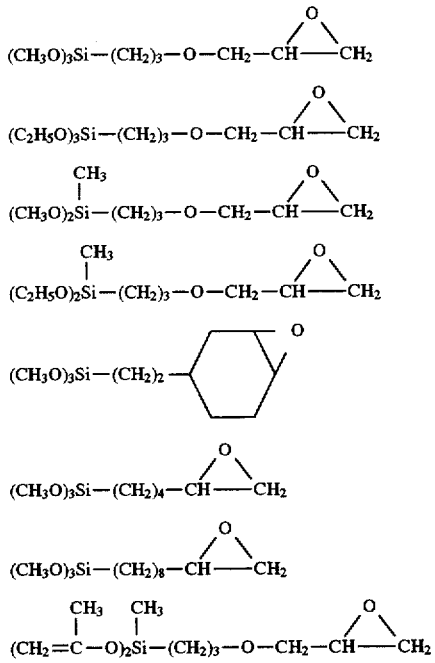

In case of using an acrylic monomer having an epoxy group as the reactive functional group, the alkoxysilane is an aminoalkylalkoxysilane (e.g. γ-aminopropyltrimethoxysilane, γ-aminopropyltriethoxysilane, γ-aminopropylmethyldimethoxysilane, N-aminoethylaminopropyltrimethoxysilane, N-aminoethylaminopropylmethyldimethoxysilane, 1,3-diaminoisopropyltrimethoxysilane, γ-N-phenylaminopropyltrimethoxysilane, bis(trimethoxysilylpropyl)amine). Besides, in case of using an acrylic monomer having an NCO group as the reactive functional group, the alkoxysilane is a member selected from mercaptoalkoxysilanes (e.g. γ-mercaptopropyltrimethoxysilane, γ-mercaptopropylmethyldimethoxysilane) and aminoalkylalkoxysilanes (e.g. γ-aminopropyltrimethoxysilane, γ-aminopropyltriethoxysilane, γ-aminopropylmethyldimethoxysilane, N-aminoethylaminopropyltrimethoxysilane, N-aminoethylaminopropylmethyldimethoxysilane,1,3-diaminoisopropyltrimethoxysilane, γ-N-phenylaminopropyltrimethoxysilane, bis(trimethoxysilylpropyl)amine).

In the moisture curable polymer composition of the present invention, the fine particles of an acrylic copolymer (B) are well homogeneously dispersed in the polymer (A), and it has also urethane bonds or urea bond in the molecule (which has a high porality), and hence, when it is cured, it gives a cured product having excellent mechanical properties, toughness and adhesiveness. Besides, even by incorporating a filler or a plasticizer to the composition, the properties are not lowered. In addition, by introducing a hydrolyzable silyl group also into the acrylic polymer fine particles, the tensile strength at breakage and elongation at breakage of the product is more improved.

The moisture curable polymer composition of the present invention is useful as a coating material, a sealant, an adhesive having superior properties than that of the conventional polyethers having at least one reactive silyl group. When the moisture curable polymer composition of the present invention is used for the above utilities, there are incorporated with conventional additives, such as fillers (e.g. calcium carbonate, talc, clay, silica, carbon, etc.), plasticizers (e.g. dioctyl phthalate, dibutyl phthalate, dioctyl adipate, paraffin chloride, petroleum plasticizer, etc.), solvent, tackifiers, adhesive promoter, curing catalysts, reinforcements, pigments, anti-sagging agents, antioxidant, stabilizer, and ultraviolet absorber.

The moisture curable polymer composition of present invention is illustrated by the following Examples and Reference Examples but should not be construed to be limited thereto.

EXAMPLE 1

A polypropylene glycol having a number average molecular weight of 10,000 (PPG) (PML-4010, manufactured by Asahi Glass, Co., Ltd., Japan) (105 g) is entered in a 300 ml volume separable flask and is heated at 80° C., and thereto is added dropwise a mixture of methyl methacrylate (45 g), γ-mercaptopropylmethyldimethoxysilane (KBM-802, manufactured by Shin-Etsu Silicone Co., Ltd., Japan) (0.04 g), ethylene glycol dimethacrylate (Light Ester EG, manufactured by Kyoei-sha Kagaku K.K., Japan) (0.26 g) and azobisisobutyronitrile (AIBN) (0.27 g) with stirring under nitrogen atmosphere over a period of 4 hours, and at the same temperature AIBN (0.54 g) is further added, and the mixture is stirred for 2 hours to proceed the copolymerization reaction to form fine particles of an acrylic copolymer dispersed in the staring polymer PPG.

After cooling to 70° C., the reaction product is reacted with tolylene diisocyanate (3.35 g) (OH/NCO=1/2.1) for 24 hours to form a free isocyanate (NCO) group. After allowing to cool till room temperature, γ-aminopropylmethyldiethoxysilane (KBE-902, manufactured by Shin-Etsu Silicone Co., Ltd., Japan) (3.16 g) is added, and the mixture is reacted with stirring, by which a hydrolyzable silyl group is introduced at the termini of the PPG to give the desired moisture curable polymer composition. This composition is turbid but is stable, and no precipitate of the acrylic copolymer fine particles is observed even after allowing to stand.

The composition is mixed with dibutyl tin dilaurate as a curing catalyst and the mixture is spreaded to form a sheet having a thickness of 2 mm, and the sheet is cured with wet at 20° C. and 65% relative humidity (RH) for 7 days. As to the product, various properties with JIS #3 Dumbbell, such as 50%, 100% tensile modulus [$M_{50}$, $M_{100}$] (kg.f/cm$^2$), tensile strength at breakage [Tb] (kg.f/cm$^2$), and elongation at breakage [Eb] (%). The results are shown in Table 1.

Reference Example 1

Example 1 is repeated except that ethylene glycol dimethacrylate is omitted. That is, PPG (PML-4010, manufactured by Asahi Glass Co., Ltd., Japan) (105 g) is entered in a 300 ml volume separable flask and is heated at 80° C., and thereto is added dropwise a mixture of methyl methacrylate (45 g), γ-mercaptopropylmethyldimethoxysilane (KBM-802, manufactured by Shin-Etsu Silicone Co., Ltd., Japan) (0.04 g) and AIBN (0.26 g) with stirring under nitrogen atmosphere over a period of 4 hours, and at the same temperature AIBN (0.54 g) is further added, and the mixture is stirred for 2 hours to proceed the copolymerization reaction to form fine particles of an acrylic copolymer dispersed in the PPG.

After cooling to 70° C., the reaction product is reacted with tolylene diisocyanate (3.35 g) for 24 hours to form a free isocyanate (NCO) group. After allowing to cool till room temperature, γ-aminopropylmethyldiethoxysilane (KBE-902, manufactured by Shin-Etsu Silicone Co., Ltd., Japan) (3.16 g) is added, and the mixture is reacted with stirring, by which a hydrolyzable silyl group is introduced at the termini of the PPG to give a moisture curable polymer composition. By using this composition a sheet is prepared and cured with moisture, and then various properties thereof are measured in the same manner as in Example 1. The results are shown in Table 1.

Reference Example 2

A polypropylene glycol having a number average molecular weight of 8,000 and having hydrolyzable silyl groups at both termini thereof (Silyl SAT-200, manufactured by Kaneka Corporation, Japan) (105 g) is entered in a 300 ml volume separable flask and is heated at 80° C., and thereto is added dropwise a mixture of methyl methacrylate (45 g), γ-mercaptopropylmethyldimethoxysilane (KBM-802) (0.04 g) and AIBN (0.26 g) with stirring under nitrogen atmosphere over a period of 4 hours, and at the same temperature AIBN (0.54 g) is further added, and the mixture is stirred for 2 hours to proceed the copolymerization reaction to form fine particles of an acrylic copolymer dispersed in the base polymer to give a moisture curable polymer composition. By using this composition a sheet is prepared and cured with moisture, and then various properties thereof are measured in the same manner as in Example 1. The results are shown in Table 1.

Reference Example 3

By using a commercially available modified silicone polymer for an elastic adhesive, a sheet is prepared and cured with moisture, and then various properties thereof are measured in the same manner as in Example 1. The results are shown in Table 1.

EXAMPLE 2

PPG (PML-4010, manufactured by Asahi Glass, Co., Ltd., Japan) (105 g) is entered in a four-necked separable flask with a reflux tube, an inlet of nitrogen gas, a thermometer and a stirring device, and it is heated at 80° C. Thereto is added dropwise a mixture of methyl methacrylate (45 g), γ-mercaptopropylmethyldimethoxysilane (KBM-802) (0.04 g), 1,6-hexandiol dimethacrylate (Light Ester 16HX, manufactured by Kyoei-sha Kagaku K.K., Japan) (0.34 g) and AIBN (0.32 g) with stirring under nitrogen atmosphere over a period of 4 hours, and at the same temperature AIBN (0.45 g) is further added, and the mixture is stirred for 2 hours to proceed the copolymerization reaction to form fine particles of an acrylic copolymer dispersed in the PPG.

Thereafter, isocyanato-propyltriethoxysilane (KBM-9207, manufactured by Shin-Etsu Silicone Co., Ltd., Japan) (3.47 g) is added to the above product, and the mixture is reacted at 80° C. for 18 hours, by which a hydrolyzable silyl group is introduced at the termini of the PPG to give the desired moisture curable polymer composition having a milky white color. By using this composition a sheet is prepared and cured with moisture, and then various properties thereof are measured in the same manner as in Example 1. The results are shown in Table 1.

EXAMPLE 3

PPG (PML-4010, manufactured by Asahi Glass, Co., Ltd., Japan) (70 g) is entered in a 300 ml volume separable flask and is heated at 80° C., and thereto is added dropwise a mixture of methyl methacrylate (30 g), ethylene glycol dimethacrylate (Light Ester EG) (0.18 g), γ-mercaptopropylmethyldimethoxysilane (KBM-802) (0.03 g), methacryloyloxypropyltrimethoxysilane (KBM-503, manufactured by Shi-Etsu Silicone Co., Ltd., Japan) (0.37 g) and AIBN (0.15 g) with stirring under nitrogen atmosphere over a period of 4 hours, and at the same temperature AIBN (0.30 g) is further added, and the mixture is stirred for 2 hours to proceed the copolymerization reaction to form fine particles of an acrylic copolymer dispersed in the PPG.

After cooling to 70° C., the reaction product is reacted with tolylene diisocyanate (2.23 g) (OH/NCO=1/2.1) for 24 hours to form a free isocyanate (NCO) group. After allowing to cool till room temperature, γ-aminopropylmethyldiethoxysilane (KBE-902) (2.10 g) is added, and the mixture is reacted with stirring, by which a hydrolyzable silyl group is introduced at the termini of the PPG to give the desired moisture curable polymer composition. By using this composition a sheet is prepared and cured with moisture, and then various properties thereof are measured in the same manner as in Example 1. The results are shown in Table 1.

TABLE 1

| Properties | Example No. | | | Ref. Ex. No. | | |
| --- | --- | --- | --- | --- | --- | --- |
| | 1 | 2 | 3 | 1 | 2 | 3 |
| $M_{50}$ | 4.0 | 4.1 | 4.05 | 5.9 | 4.2 | 4.5 |
| $M_{100}$ (kg·f/cm$^2$) | — | 6.4 | 6.04 | — | — | — |
| Tb (kg·f/cm$^2$) | 50.3 | 41.8 | 36.8 | 25.1 | 22.6 | 28.0 |
| Eb (%) | 800 | 700 | 580 | 350 | 370 | 320 |

EXAMPLE 4

Preparation of an adhesive:

The moisture curable composition obtained in Example 1 or Example 2 (each 50 parts by weight) is incorporated with a resin acid-treated calcium carbonate (25 parts by weight), calcium carbonate (15 parts by weight), an alkylbenzene plasticizer (10 parts by weight) and γ-aminopropyltrimethoxysilane (as an adhesive promoter, 3 parts by weight) to give one-pack, room temperature moisture curable adhesives (No. 1 and No. 2, respectively).

The adhesiveness (onto various adherends) of the above adhesive No. 1 and No. 2 was compared with a conventional one-pack, room temperature moisture curable urethane adhesive (No. 3) and two-pack, room temperature moisture curable epoxy-modified silicone adhesive (No. 4).

The results are shown in Table 2, wherein "o" means good adhesiveness and "x" means bad adhesiveness.

TABLE 2

| Adherends | Adhesive | | | |
|---|---|---|---|---|
| | No. 1 | No. 2 | No. 3 | No. 4 |
| Glass | o | o | x | x |
| Coated surface | o | o | o | x |
| Aluminum | o | o | x | o |

[Note]:
(1) The curing conditions: 35° C., 90% RH for 7 days
(2) Adhesive test: Peeling with hand after cutting with a knife.

EXAMPLE 5

To PPG (PML-4010, manufactured by Asahi Glass, Co., Ltd., Japan) (105 g) is added tolylene diisocyanate (3.35 g) (OH/NCO=1/2.1), and the mixture is reacted under nitrogen gas at 70° C. for 24 hours to give a PPG having NCO at the termini thereof. After allowing to cool till room temperature, γ-aminopropylmethyldiethoxysilane (KBE-902) (2.22 g) is added, and the mixture is reacted with stirring, by which a hydrolyzable silyl group is introduced at the termini of the polymer.

The above product is again heated to 80° C., and thereto is added dropwise a mixture of methyl methacrylate (45 g), γ-mercaptopropylmethyldimethoxysilane (KBM-802) (0.04 g), ethylene glycol dimethacrylate (Light Ester EG) (0.27 g) and AIBN (0.23 g) with stirring under nitrogen atmosphere over a period of 4 hours, and AIBN (0.45 g) is further added, and the mixture is stirred for 2 hours to proceed the copolymerization reaction to form fine particles of an acrylic copolymer dispersed in the PPG having hydrolyzable silyl group at the termini to give the desired moisture curable polymer composition.

EXAMPLE 6

PPG (PML-4010, manufactured by Asahi Glass, Co., Ltd., Japan) (105 g) is heated at 80° C., and thereto is added dropwise a mixture of methyl methacrylate (45 g), laurylmercaptane (0.05 g), ethylene glycol dimethacrylate (Light Ester EG) (0.27 g) and AIBN (0.23 g) with stirring under nitrogen atmosphere over a period of 4 hours, and AIBN (0.45 g) is further added, and the mixture is stirred for 2 hours to proceed the copolymerization reaction to form fine particles of an acrylic copolymer dispersed in the PPG.

After cooling to 70° C., the reaction product is reacted with tolylene diisocyanate (3.35 g) for 24 hours to form a free isocyanate (NCO) group. After allowing to cool till room temperature, γ-aminopropylmethyldiethoxysilane (KBE-902) (2.22 g) is added, and the mixture is reacted with stirring, by which a hydrolyzable silyl group is introduced at the termini of the PPG to give the desired moisture curable polymer composition.

EXAMPLE 7

PPG (PML-4010, manufactured by Asahi Glass, Co., Ltd., Japan) (105 g) is heated at 80° C., and thereto is added dropwise a mixture of methyl methacrylate (45 g), γ-mercaptopropylmethyldimethoxysilane (KBM-802) (0.04 g), ethylene glycol dimethacrylate (Light Ester EG) (0.27 g), 2-hydroxyethyl methacrylate (0.15 g) and AIBN (0.23 g) with stirring under nitrogen atmosphere over a period of 4 hours, and AIBN (0.45 g) is further added. After cooling to 70° C., to the reaction mixture is added diisocyanatopropylmethyldimethoxysilane (KBM-9207) (3.68 g), and the mixture is reacted for 24 hours to give the desired moisture curable polymer composition, wherein fine particles of an acrylic polymer are dispersed within the PPG having hydrolyzable silyl group at the termini.

EXAMPLE 8

PPG (PML-4010, manufactured by Asahi Glass, Co., Ltd., Japan) (105 g) is heated at 80° C., and thereto is added dropwise a mixture of methyl methacrylate (38.86 g), glycidyl methacrylate (6.14 g), ethylene glycol dimethacrylate (Light Ester EG) (0.26 g) and AIBN (0.23 g) with stirring under nitrogen atmosphere over a period of 4 hours, and AIBN (0.45 g) is further added, and the mixture is stirred for 2 hours to proceed the copolymerization reaction. After cooling to 70° C., to the reaction mixture is added tolylene diisocyanate (3.35 g) and the mixture is reacted with stirring for 24 hours. To the reaction product is added aminophenylpropyltrimethoxysilane (KBM-573) (4.40 g), and the mixture is further reacted at 70° C. for 3 hours to give the desired moisture curable polymer composition, wherein fine particles of an acrylic copolymer are dispersed within the PPG having hydrolyzable silyl group at the termini.

By using the compositions as produced in the above Examples 5 to 8, a sheet is prepared and cured with moisture, and then various properties thereof are measured in the same manner as in Example 1. The results are shown in Table 3.

TABLE 3

| Properties | Example No. | | | |
|---|---|---|---|---|
| | 5 | 6 | 7 | 8 |
| $M_{50}$ | 4.67 | 5.8 | 4.5 | 5.2 |
| $M_{100}$ (kg · f/cm$^2$) | 6.89 | 9.2 | 5.8 | 8.9 |
| Tb (kg · f/cm$^2$) | 51.60 | 61.3 | 45.2 | 50.7 |
| Eb (%) | 700 | 500 | 600 | 500 |

What is claimed is:

1. A moisture curable polymer composition, which comprises (A) a polymer having residues of at least two functional groups reactive with an isocyanate group selected from a hydroxyl group, a mercapto group and a mono-substituted or unsubstituted amino group of the formula —NHR, wherein R is a hydrogen atom, an alkyl having 1 to 10 carbon atoms, or phenyl, and further at least two hydrolyzable silyl groups in the molecule, wherein the silyl groups are bonded via a urethane bond or urea bond to the residues of the functional groups, and (B) fine particles of an acrylic copolymer having a hydrolyzable silyl group within the molecule produced by copolymerizing an acrylic monomer having one polymerizable unsuturated group and a hydrolyzable silyl group and an acrylic monomer having two or more (meth)acryloyloxy groups, wherein the fine particles of an acrylic copolymer (B) are homogeneously dispersed in the polymer (A).

2. A moisture curable polymer composition according to claim 1, wherein the acrylic monomer having two or more (meth)acryloyloxy group is incorporated in an amount of not more than 10% by mole in the fine particles of acrylic copolymer.

3. A process for the production of a moisture curable polymer composition as set forth in claim 1, which comprises the steps of (i) copolymerizing an acrylic monomer having one polymerizable unsaturated group and a hydrolyzable silyl group and an acrylic monomer having two or more (meth)acryloyloxy groups in the presence of a polymer (A') having at least two functional groups reactive with an isocyanate group selected from a hydroxyl group, a mercapto group and a mono-substituted or unsubstituted amino group of the formula —NHR, wherein R is a hydrogen atom, an alkyl having 1 to 10 carbon atoms or phenyl, thereby dispersing homogeneously fine particles of the resulting acrylic copolymer (B) in the polymer (A'), and (ii)-1 reacting the functional groups of the polymer (A') with an excess amount of a diisocyanate compound to form a free isocyanate group, and then reacting the isocyanate group with an alkoxysilane having a functional group reactive therewith, by which introducing at least two hydrolyzable silyl groups via a urethane bond or a urea bond within the molecule of the polymer (A').

4. A process for the production of a moisture curable polymer composition as set forth in claim 1, which comprises the steps of (i) copolymerizing an acrylic monomer having one polymerizable unsaturated group and a hydrolyzable silyl group and an acrylic monomer having two or more (meth)acryloyloxy groups in the presence of a polymer (A') having at least two functional groups reactive with an isocyanate group selected from a hydroxyl group, a mercapto group and a mono-substituted or unsubstituted amino group of the formula —NHR, wherein R is a hydrogen atom, an alkyl having 1 to 10 carbon atoms, or phenyl, thereby dispersing homogeneously fine particles of the resulting acrylic copolymer (B) in the polymer (A'); and (ii)-2 reacting the functional groups of the polymer (A') with an isocyanatoalkoxysilane, by which introducing at least two hydrolyzable silyl groups via a urethane bond or a urea bond within the molecule of the polymer (A').

5. A process for the production of a moisture curable polymer composition as set forth in claim 1, which comprises the steps of (i')-1 reacting a polymer (A') having at least two functional groups reactive with an isocyanate group selected from a hydroxyl group, a mercapto group and a mono-substituted or unsubstituted amino group of the formula —NHR, wherein R is a hydrogen atom, an alkyl having 1 to 10 carbon atoms, or phenyl with a diisocyanate compound to form a free isocyanate group, and reacting the resultant isocyanate group with an alkoxysilane having a functional group reactive with the isocyanate group, or (i')-2 reacting the polymer having at least two functional groups (A') as mentioned above with an isocyanatoalkoxysilane, by which introducing at least two hydrolyzable silyl groups via a urethane bond or a urea bond in the molecule of the polymer (A'); and (ii') copolymerizing an acrylic monomer having one polymerizable unsaturated group and a hydrolyzable silyl group and an acrylic monomer having two or more (meth)acryloyloxy groups in the presence of the polymer (A') obtained in the above (i')-1 or (i')-2, by which fine particles of an acrylic copolymer (B) produced by the above copolymerization are homogeneously dispersed in the polymer (A').

6. A process according to claim 4, wherein the acrylic monomer having two or more (meth)acryloyloxy groups to be copolymerized is used in an amount of not more than 10% by mole based on the total amount of the acrylic monomers.

7. A process according to claim 4, wherein the polymer having at least two functional groups reactive with an isocyanate group selected from a hydroxyl group, a mercapto group and a mono-substituted or unsubstituted amino group is a member selected from the group consisting of a polyether polyol, a polyalkylene glycol, a polytetramethylene ether glycol, a polycaprolactone polyol, a polyester polyol, a polybutadiene polyol, a hydroxyl group-containing higher fatty acid ester, a liquid polysulfide polymer, and a polymer having an amino group at the termini.

8. A process according to claim 4, wherein the acrylic monomer having two or more (meth)acryloyloxy groups is a compound of the formula:

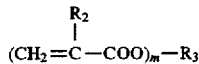

wherein $R_2$ is H or $CH_3$, $R_3$ is a residue of an alkanediol having 4 to 10 carbon atoms, an alkylene glycol or polyalkylene glycol having 2 to 6 carbon atoms, m is an integer of 2 or more.

9. A process according to claim 8, wherein the acrylic monomer is a member selected from the group consisting of 1,4-butanediol di(meth)acrylate, 1,6-hexanediol di(meth)acrylate, 1,9-nonanediol di(meth)acrylate, neopentyl glycol di(meth)acrylate, ethylene glycol di(meth)acrylate, diethylene glycol di(meth)acrylate, triethylene glycol di(meth)acrylate, polyethylene glycol (#200, 400, 600) di(meth)acrylate, 1,3-butylene glycol di(meth)acrylate, dipropylene glycol di(meth)acrylate, polypropylene glycol di(meth)acrylate, tetraethylene glycol diacrylate, tripropylene glycol diacrylate, trimethylolpropane tri(meth)acrylate, trimethylolethane tri(meth)acrylate, pentaerythritol tri(meth)acrylate, pentaerythritol tetraacrylate.

10. A process according to claim 4, wherein the fine particle of an acrylic copolymer produced by copolymerization of an acrylic monomer having one polymerizable unsaturated group and an acrylic monomer having two or more (meth)acryloyloxy group are introduced by a hydrolyzable silyl group.

11. A process according to claim 10, wherein the introduction of the hydrolyzable silyl group is effected by proceeding the copolymerization reaction of the acrylic monomers in the presence of not more than 1% by mole of a chain transfer agent selected from γ-mercaptopropylmethyldimethoxysilane and γ-mercaptopropyltrimethoxysilane.

12. A process according to claim 10, wherein the introduction of the hydrolyzable silyl group is effected by proceeding the copolymerization reaction of the acrylic monomers by using at least one of a monomer selected from a vinylsilane having a hydrolyzable group and a (meth)acryloyloxyalkylsilane having a hydrolyzable group as a part of the one polymerizable unsaturated group-containing acrylic monomer.

13. A process according to claim 10, wherein the introduction of the hydrolyzable silyl group is effected by proceeding the copolymerization reaction of the acrylic monomers by using a monomer selected from a hydroxy group-containing acrylic monomer, an amino group-containing acrylic monomer, an isocyanate group-containing acrylic monomer, a mercapto group-containing acrylic monomer, an epoxy group-containing acrylic monomer, and a carboxyl group-containing acrylic monomer, and thereafter, reacting the resulting polymer with an alkoxysilane which is reactive to the functional group in the resulting polymer.

14. Product made by the process of claim 3.

15. Product made by the process of claim 4.
16. Product made by the process of claim 5.
17. Product made by the process of claim 6.
18. Product made by the process of claim 7.

19. Product made by the process of claim 8.

* * * * *